United States Patent
Vu (10) Patent No.: US 7,606,593 B1
(45) Date of Patent: Oct. 20, 2009

(54) PRIORITY DISPATCH COMMUNICATIONS IN PUBLICLY-ACCESSIBLE NETWORKS

(75) Inventor: Trinh D. Vu, Ashburn, VA (US)

(73) Assignee: Nextel Communications Inc., Reston, VA (US)

( * ) Notice: Subject to any disclaimer, the term of this patent is extended or adjusted under 35 U.S.C. 154(b) by 554 days.

(21) Appl. No.: 11/294,395

(22) Filed: Dec. 6, 2005

(51) Int. Cl.
*H04B 7/00* (2006.01)

(52) U.S. Cl. .................. 455/527; 455/518; 455/519; 455/521

(58) Field of Classification Search ......... 455/517–521, 455/527
See application file for complete search history.

(56) References Cited

U.S. PATENT DOCUMENTS

| | | | | |
|---|---|---|---|---|
| 5,537,684 A | * | 7/1996 | Cassidy et al. | 455/512 |
| 6,067,457 A | * | 5/2000 | Erickson et al. | 455/512 |
| 6,535,743 B1 | * | 3/2003 | Kennedy et al. | 455/456.1 |

* cited by examiner

*Primary Examiner*—Raymond S Dean (57) ABSTRACT

A system and method for priority dispatch communications are provided. Priority access to the communication network is provided. Additionally, barge-in for active dispatch communications in a publicly-accessible network are provided. When the user is in an active dispatch communication with another communication station, and a dispatch communication request from a second communication station is received, it is determined whether a priority value of the second communication station is higher than a priority value assigned to the user or the other communication station. When the priority value for the second communication station is higher, the dispatch communication between the user and the other communication station is suspended, and a dispatch communication is established between the user and the second communication station.

21 Claims, 5 Drawing Sheets

PRIORITY DISPATCH COMMUNICATIONS IN PUBLICLY-ACCESSIBLE NETWORKS

BACKGROUND OF THE INVENTION

The mobility afforded by wireless communication networks has resulted in increased usage of such networks. Wireless networks can be divided into private wireless networks and publicly-accessible wireless networks. Private wireless networks, also known as private trunking radio networks, are commonly operated by public safety agencies, taxi services and delivery services. A majority of private wireless networks provide only dispatch communication services, whereas a majority of publicly-accessible wireless networks provide only interconnect communication services. Dispatch communication services are sometimes referred to as "walkie-talkie" communication services because of the half-duplex nature of the communications. Interconnect communication services are what is typically referred to as circuit-switched voice communications.

Private wireless networks typically operate over a limited range of frequencies and within limited geographic areas. Additionally, private wireless networks typically operate using proprietary protocols, have limited expansion capabilities, are expensive to operate and cannot easily interoperate with other private or publicly-accessible wireless networks. In contrast, publicly-accessible wireless networks typically operate over a larger number of frequencies and provide coverage over larger geographic areas. Moreover, publicly-accessible wireless networks use standard protocols, are easier to expand, and interoperate with other publicly-accessible wireless networks.

Private wireless networks are typically preferred by public safety agencies because of the reliability of these networks in emergency situations compared to publicly-accessible wireless networks which can block calls during emergency situations. Public safety agencies are attracted to publicly-accessible wireless networks as a way to reduce the costs associated with operating and maintaining a private wireless network.

Due to the relative complexity of publicly-accessible wireless networks compared to private wireless networks, some of the features and functionalities provided in private wireless networks are not offered in publicly-accessible wireless networks. Specifically, private wireless networks typically have a single, centrally-located, communications processor (or call handler) for managing and routing communications between wireless stations. In contrast, publicly-accessible wireless networks have a distributed architecture, which involves routing communications between a number of communication processors.

SUMMARY OF THE INVENTION

Systems and methods for priority communications for dispatch communications in a publicly-accessible communication network are disclosed. In accordance with one aspect of the present invention, priority values can be used for determining whether a mobile station is granted access to the communication network when resources are not available in the communication network due to network load. When a mobile station with an associated predetermined priority value attempts a dispatch call request and there are not resources available to support the dispatch call request, the communication network can drop an existing dispatch communication with a lower priority value in order to accommodate the higher priority value dispatch call request.

In accordance with another aspect of the present invention, systems and methods for facilitating priority interrupt or so-called "barge-in" on active dispatch communications in a publicly-accessible communication network are disclosed. When a dispatch communication is initiated from a second communication station to a user active in a dispatch communication with another communication station, it is determined whether the priority value of the second communication station is higher than a priority value assigned to the user or to the other communication station. When the priority value assigned to the second communication station is higher than the priority value assigned to the user or the other communication station, the dispatch communication between the user and the other communication station is suspended, and a dispatch communication between the user and the second communication station is established.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1A:
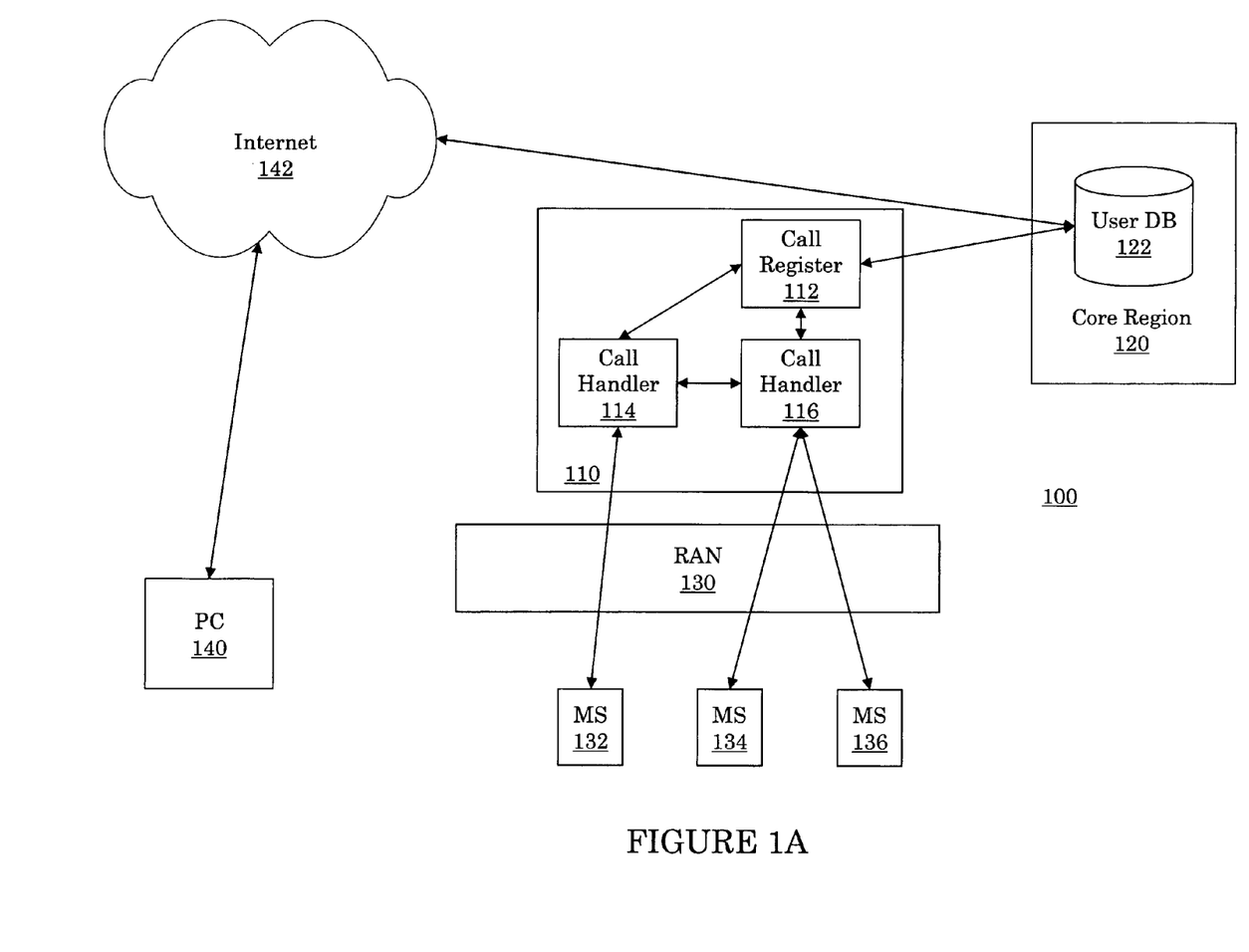
FIGS. 1A and 1B illustrate exemplary communication systems in accordance with the present invention.

FIG. 1A illustrates an exemplary system 100 for facilitating a priority access and priority interrupt or so-called "barge-in" in accordance with the present invention. As recognized by those skilled in the art, a barge-in is the act of automatically interrupting an existing call for another call. The system includes a dispatch area network subsystem 110, a core region 120 and a radio access network (RAN) 130. A dispatch area is a geographic area which includes two or more cells that share network subsystems, such as mobile switching centers (MSCs) and location registers. The dispatch area network subsystem 110 includes a call register 112, and first and second call handlers 114 and 116. The core region 120 includes a user database 122.

The call register 112 generally operates in a similar manner to a location register and performs the functions of a home location register (HLR) to register and authenticate the user. Each of the first and second call handlers 114 and 116 generally operates in a similar manner to a mobile switching center/visitor location register (MSC/VLR) or a dispatch application processor (DAP). The first call handler 114 is illustrated as handling communications from mobile station 132, and the second call handler 116 is illustrated as handling communications from mobile stations 134 and 136.

A user of the priority barge-in feature of the present invention can generate a priority list using either a mobile station, a personal computer (PC) 140, or the like. Specifically, the personal computer 140 in FIG. 1A can access, via Internet 142, the user database 122 for generating or modifying the priority list. The PC 140 would typically use a web-based interface for accessing the user database 122. Alternatively, a user interface for generating or modifying the priority list can be provided on the user's mobile station.

Figure 1B:
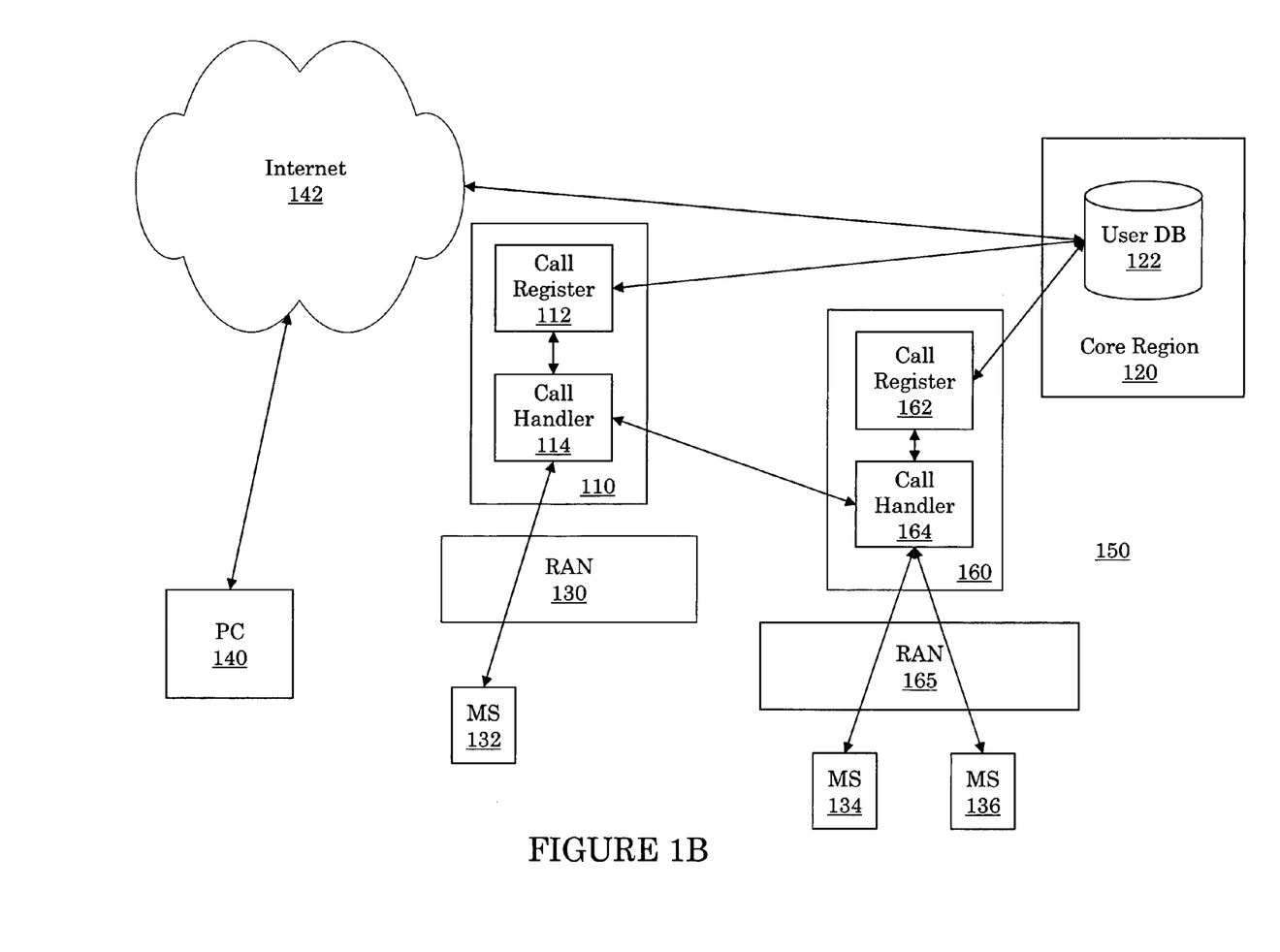

FIG. 1B illustrates a system in accordance with another embodiment of the present invention. The system illustrated in FIG. 1B is similar to the system illustrated in FIG. 1A, and hence, like elements include the same reference numbers. The difference between the systems of FIGS. 1A and 1B is that in FIG. 1A the first and second call handlers 114 and 116 are located in the same dispatch area network subsystem 110, whereas in FIG. 1B, the first and second call handlers are located in different dispatch area subsystems 110 and 160. Because the second call handler 164 is located in a different dispatch area subsystem than the first call handler 114, the second call handler uses a different call register and RAN, i.e., call register 162 and RAN 165.

Figure 2:
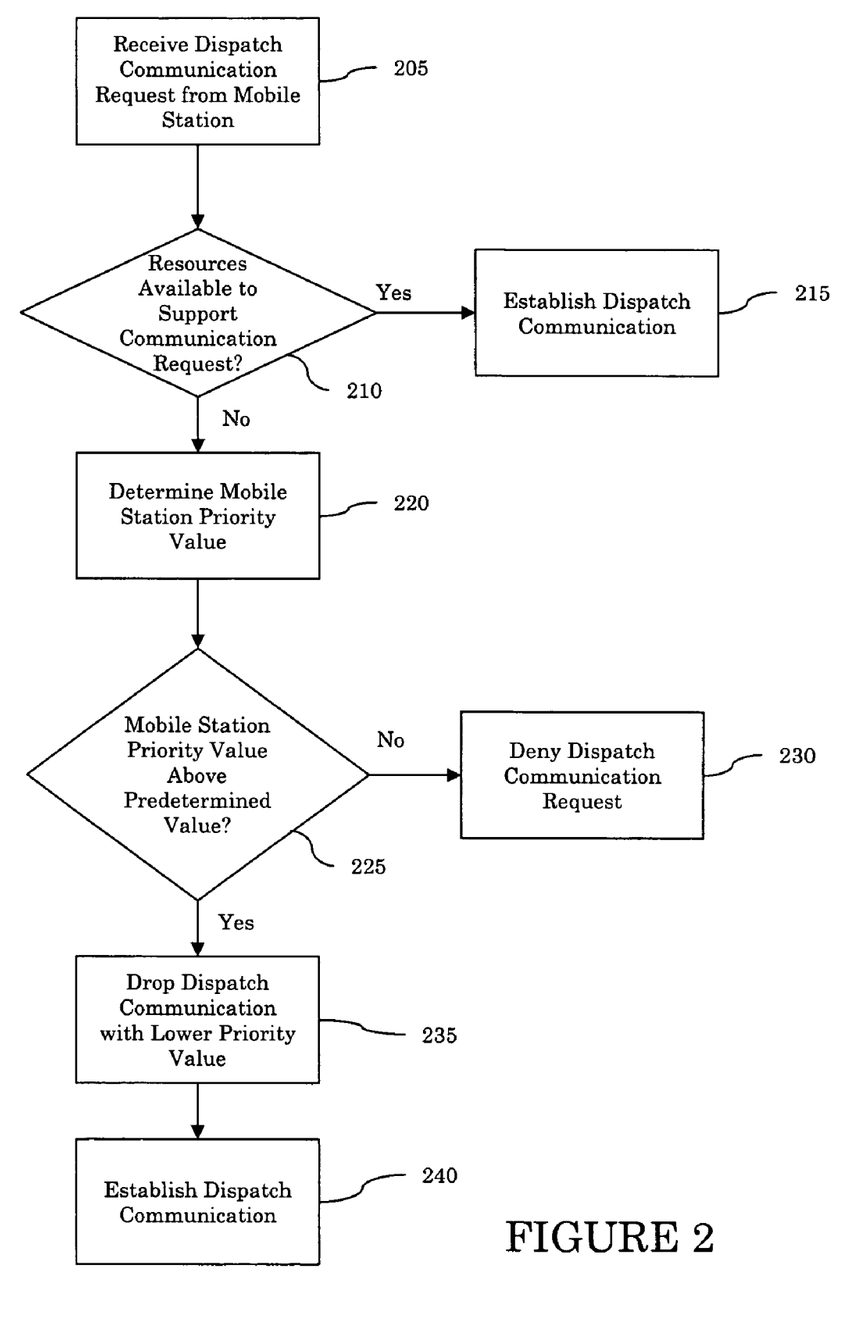
FIG. 2 illustrates an exemplary method for handling incoming dispatch communication requests in accordance with the present invention.

The operation of the systems illustrated in FIGS. 1A and 1B will be described in connection with the methods illustrated in FIGS. 2-4. FIG. 2 illustrates an exemplary method for handling incoming dispatch communication requests in accordance with the present invention. When a call handler, for example call handler 114, receives a dispatch communication request (step 205), the call handler determines whether there are sufficient resources available to support the call request (step 210). When there are sufficient resources available to support the call request ("Yes" path out of decision step 210), then the call handler establishes the dispatch call (step 215).

When there are not sufficient resources available to support a dispatch call from the mobile station ("No" path out of decision step 210), then the call handler determines a priority value for the mobile station (step 220). The call handler can determine the priority value by accessing a value stored in a local cache. Alternatively, or additionally, the priority value may be part of the received dispatch call request, or can be in a separate message. The call handler then determines whether the mobile station has a priority value above a predetermined priority value (step 225). When the mobile station's priority value is not above the predetermined priority value ("No" path out of decision step 225), then the call handler denies the dispatch call request. However, when the mobile station's priority value is above the predetermined priority value ("Yes" path out of decision step 225), then the call handler drops a dispatch call that has a lower priority value (step 235) and establishes the dispatch call for the mobile station (step 240).

Figure 3:
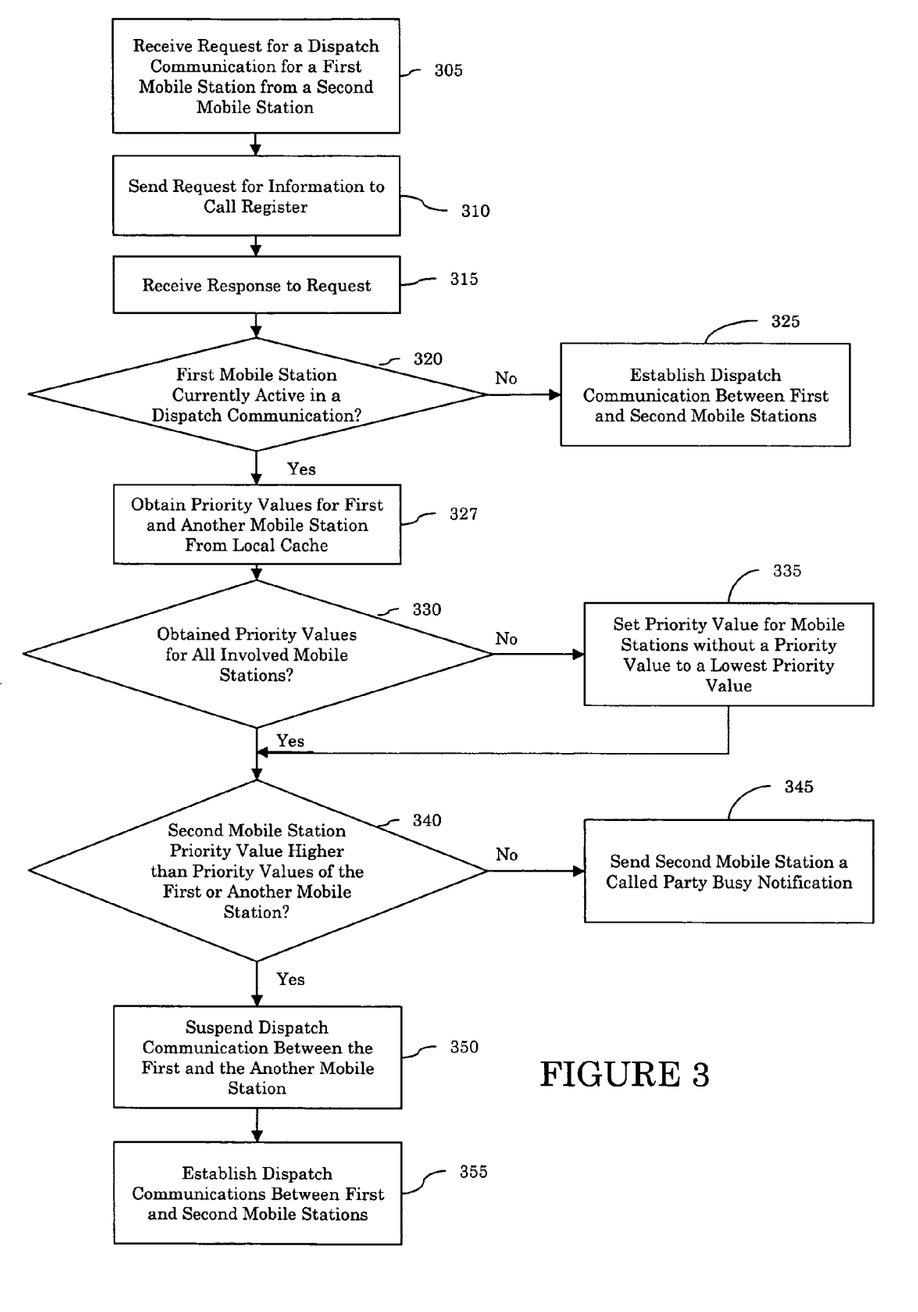
FIG. 3 illustrates an exemplary method for handling an incoming dispatch communication in accordance with the present invention.

FIG. 3 illustrates an exemplary method for handling an incoming dispatch communication in accordance with the present invention. For the purposes of description of the method of FIG. 3, assume that mobile station 136 is attempting to initiate a dispatch communication with mobile station 132. Accordingly, call handler 114 receives a request to initiate dispatch communications with mobile station 132 from call handler 116 or 164 (step 305). Call handler 114 sends a request for information about the second mobile station to the call register 112 (step 310). Call register 112 accesses its memory and provides a response to call handler 114 with, among other information, a priority value for mobile station 136 (step 315).

Call handler 114 then determines whether mobile station 132 is currently active in a dispatch communication (step 320). If mobile station 132 is not currently active in a dispatch communication ("No" path out of decision step 320), then the call handler 114 establishes a dispatch communication between mobile stations 132 and 136 in a conventional manner.

Assume now that mobile station 132 is currently active in a dispatch communication with mobile station 134. In conventional publicly-accessible wireless networks, the dispatch call request from mobile station 136 would be denied due to the active dispatch communication between mobile stations 132 and 134. In accordance with exemplary embodiments of the present invention, when call handler 114 determines that mobile station 132 is currently active in a dispatch communication ("Yes" path out of decision step 320), then the call handler 114 obtains priority values for mobile stations 132 and 134 from a local cache (step 327). Priority values for mobile stations 132 and 134 are stored in the call handler's local cache when the dispatch communication between these two mobile stations is established in a similar manner to steps 310 and 315 described above.

Call handler 114 determines whether it has obtained priority values for all mobile stations involved in the barge-in attempt (step 330). If the call handler does not have priority values for all involved mobile stations ("No" path out of decision step 330), then call handler 114 sets the priority value for the mobile stations which do not have a priority value to a lowest priority value (step 335).

After the call handler 114 sets the priority value for the mobile stations without priority values (step 335), or if the call handler has priority values for all involved mobile stations ("Yes" path out of decision step 330), then call handler 114 determines whether mobile station 136 has priority over mobile station 132 or mobile station 134 (step 340). If mobile station 136 does not have priority over either mobile station ("No" path out of decision step 340), then mobile station 136 is informed that mobile station 132 is unavailable (step 345).

If call handler 114 determines that mobile station 136 has priority over either mobile station, then the dispatch communication between mobile stations 132 and 134 is suspended (step 350), and a dispatch communication is established between mobile stations 132 and 136 (step 355), in which case mobile station 136 effectively interrupts or "barges-in" on the dispatch communication between mobile stations 132 and 134.

Although the methods of FIGS. 2 and 3 have been described above separately, it will be recognized that they can be performed together.

Figure 4:
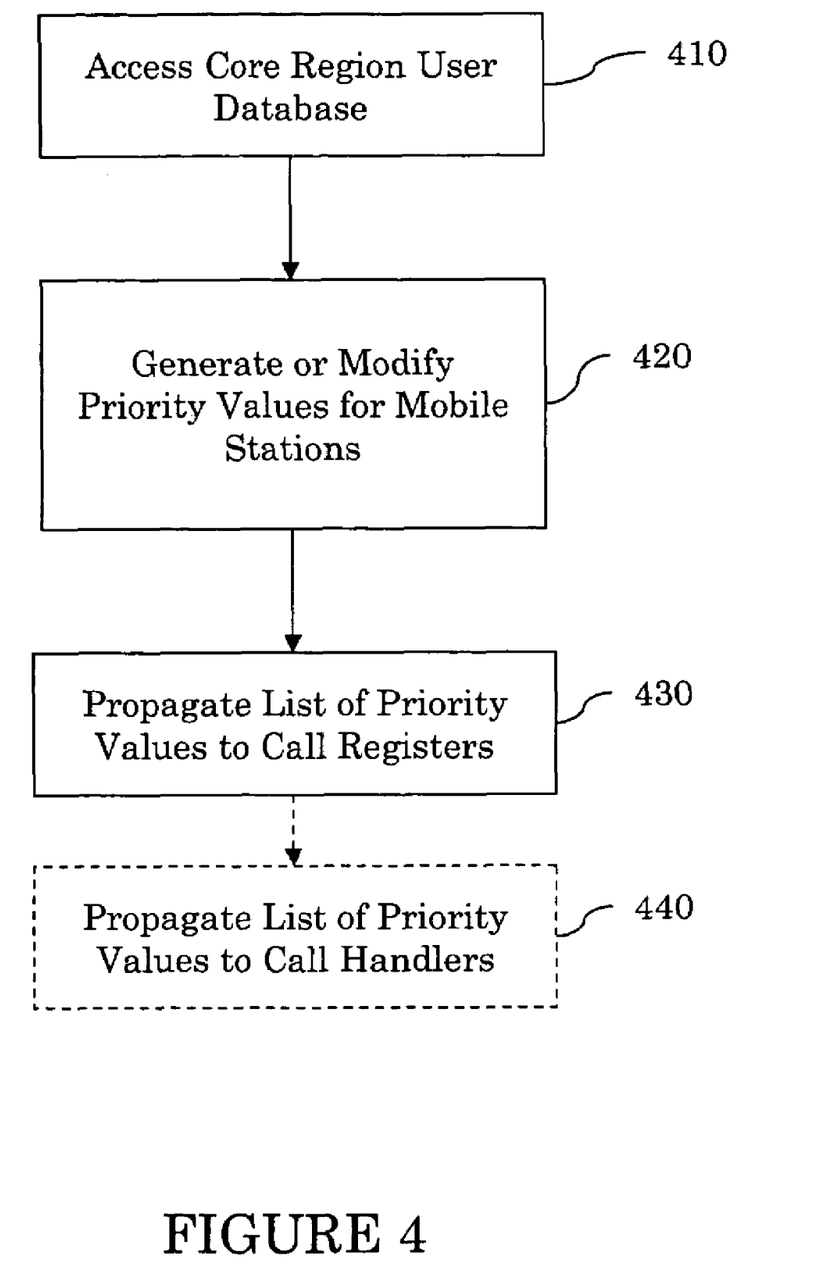
FIG. 4 illustrates an exemplary method for generating a priority list in accordance with the present invention.

FIG. 4 illustrates an exemplary method for generating a priority list in accordance with the present invention. A user of PC 140 accesses the core region user database 120 via the internet 142 (step 410). Alternatively, or additionally, the user can access the core region user database 120 via the wireless network. The user generates or modifies priority values for mobile stations (step 420). Once the user finalizes the priority values, the list of priority values are propagated to the call register where the mobile station is currently located (step 430). An optional additional step is to propagate the list of priority values to call handlers (step 440). In addition to propagating the priority list when it is updated, a priority list will be forwarded to a call register when a mobile station first registers with a call handler in a different location area than the mobile station previously registered with.

In addition to a user generating or modifying his/her own priority value, priority values can be generated or modified for a number of users by a third party. For example, a public safety agency may decide that certain people, such as supervisors, should have the ability to barge-in on all subordinates' communications. Accordingly, the public safety agency can set the supervisor's priority value to the highest possible value. Additionally, the public safety agency can set the supervisor's priority value such that it cannot be modified by the user. Moreover, a network operator may reserve priority values that can only be assigned by the network operator.

Although the present invention has been described in connection with dispatch communications between mobile stations, the present invention is equally applicable to dispatch communications between any type of communication stations capable of dispatch communications. Additionally, although exemplary embodiments have been described in connection with a barge-in to a dispatch communication between two mobile stations, the present invention is equally applicable to a barge-in to a dispatch communication between more than two mobile stations, e.g., group call.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for dispatch communication routing, the method comprising the acts of:
   receiving, by a first call handler from a second call handler, a dispatch call request originated by a second communication station for a first communication station that is active in a dispatch communication with another communication station;
   determining, by the first call handler, that the first communication station is active in the dispatch communication with the another communication station;
   determining a priority value for the first, second and the another communication stations; and
   suspending the dispatch communication between the first and the another communication stations when the determined priority value for the second communication station is greater than the determined priority value for either the first communication station or the another communication station.

2. The method of claim 1, the method further comprising the acts of:
   establishing a dispatch communication between the first and second communication stations when the determined priority value for the second communication station is greater than the determined priority value for either the first communication station or the another communication station.

3. The method of claim 1, wherein when the determined priority value for the second communication station is not greater than the determined priority value for both the first communication station and the another communication station, the dispatch call request is denied.

4. The method of claim 1, wherein the act of determining a priority value comprises the acts of:
   sending a request for information regarding the second communication station from the first call handler to a call register; and
   receiving a response to the request, wherein the response includes the priority value for the second communication station.

5. The method of claim 1, wherein the act of determining a priority value comprises the acts of:
   sending a request for information regarding the second communication station from the first call handler to a call register; and
   receiving a response to the request, wherein when the response does not include a priority value for the second communication station, the priority value for the second communication station is set to a lowest priority value.

6. The method of claim 1, wherein the act of determining a priority value comprises the act of:
   accessing a local cache to determine the priority value for the first communication station and the another communication station.

7. The method of claim 1, the method further comprising the acts of:
   receiving, by a call register, updated information for one or more communication stations, wherein the updated information includes priority values assigned by a user of the first communication station.

8. The method of claim 7, wherein the user of the first communication station assigns the values using a web-based interface.

9. The method of claim 7, wherein the user of the first communication station assigns the values using the first communication station.

10. The method of claim 1, wherein the priority values are assigned by a network operator.

11. A system for dispatch communication routing, comprising:
    a first call handler; and
    a second call handler, wherein the second call handler sends a dispatch call request which originated from a second communication station to the first call handler for dispatch communication between the second communication station and the first communication station and wherein the first communication station is in communication with another communication station, the first call handler determines that a first communication station is active in a dispatch communication with the another communication station, the first call handler determines a priority value for the first, second and the another communication stations, and the first call handler suspends the dispatch communication between the first and the another communication stations when the determined priority value for the second communication station is greater than the determined priority value for either of the first communication station or the another communication station.

12. The system of claim 11, wherein the first call handler establishes a dispatch communication between the first and second communication stations when the determined priority value for the second communication station is greater than the determined priority value for either the first communication station or the another communication station.

13. The system of claim 11, wherein when the determined priority value for the second communication station is not greater than the determined priority value for both the first communication station and the another communication station, the dispatch call request is denied.

14. The system of claim 11, wherein the determination of a priority value includes sending a request for information regarding the second communication station from the first call handler to a call register, and receiving a response to the request, wherein the response includes the priority values for the second communication station.

15. The system of claim 11, wherein the determination of a priority value includes accessing a local cache to determine the priority value for the first communication station and the another communication station.

16. The system of claim 11, wherein the determination of a priority value includes sending a request for information regarding the second communication station from the first call handler to a call register, and receiving a response to the request, wherein when the response does not include a priority value for the second communication station, the priority value for the second communication station is set to a lowest priority value.

17. The system of claim 11, wherein a call register receives updated information for one or more communication stations, wherein the updated information includes priority values assigned by a user of the first communication station.

18. The system of claim 17, wherein the user of the first communication station assigns the values using a web-based interface.

19. The system of claim 17, wherein the user of the first communication station assigns the values using the first communication station.

20. A method for establishing a dispatch communication, the method comprising the acts of:

receiving by a call handler, a dispatch call request for communication with a first communication station involved in an existing dispatch communication with another communication station;

determining by the call handler, a priority value associated with the dispatch call request upon a determination by the call handler that there are insufficient network resources to support the dispatch call request;

dropping by the call hander, the existing dispatch call involving the first communication station when granting the dispatch call request; and granting the dispatch call request when the determined priority value is above a predetermined priority value.

21. The method of claim 20, wherein the existing dispatch call has a priority value less than the priority value associated with the dispatch call request.

* * * * *

UNITED STATES PATENT AND TRADEMARK OFFICE
CERTIFICATE OF CORRECTION

PATENT NO.       : 7,606,593 B1                                                                          Page 1 of 1
APPLICATION NO.  : 11/294395
DATED            : October 20, 2009
INVENTOR(S)      : Trinh D. Vu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 872 days.

Signed and Sealed this

Twelfth Day of October, 2010

David J. Kappos
*Director of the United States Patent and Trademark Office*